(12) United States Patent
Moore, Jr.

(10) Patent No.: US 11,944,951 B2
(45) Date of Patent: Apr. 2, 2024

(54) COMPOSITION AND METHOD FOR REDUCING AMMONIA AND SOLUBLE PHOSPHORUS IN RUNOFF AND LEACHING FROM ANIMAL MANURE

(71) Applicant: The United States of America, as represented by the Secretary of Agriculture, Washington, DC (US)

(72) Inventor: Philip A. Moore, Jr., Fayetteville, AR (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 340 days.

(21) Appl. No.: 17/171,204

(22) Filed: Feb. 9, 2021

(65) Prior Publication Data

US 2021/0394154 A1    Dec. 23, 2021

Related U.S. Application Data

(60) Provisional application No. 63/042,730, filed on Jun. 23, 2020.

(51) Int. Cl.
*B01J 20/04*      (2006.01)
*B01J 20/10*      (2006.01)
(Continued)

(52) U.S. Cl.
CPC ............ *B01J 20/045* (2013.01); *B01J 20/10* (2013.01); *B09B 3/25* (2022.01); *C05F 3/00* (2013.01)

(58) Field of Classification Search
None
See application file for complete search history.

(56) References Cited

U.S. PATENT DOCUMENTS 3,996,162 A * 12/1976 McCall .................. G01N 33/78
                                                              206/524.4
5,622,697 A    4/1997 Moore, Jr.
(Continued)

FOREIGN PATENT DOCUMENTS

CN      108262003 A  *  7/2018   ............. B01J 20/14
DE   19843887 A1  * 11/1999   ........... A01K 1/1054
(Continued)

OTHER PUBLICATIONS

P.A. Moore, Jr. et al., "Reducing Phosphorus Runoff and Inhiubiting Ammonia Loss from Poultry Manure with Aluminum Sulfate", Journal of Environmental Quality, Jan./Feb. 2000, 29:37-49.*

*Primary Examiner* — Wayne A Langel
(74) *Attorney, Agent, or Firm* — John Fado; John Henri

(57) ABSTRACT

Calcium silicate hydrate nanoparticles are combined with ammonia control materials (e.g. alum, aluminum chloride, ferric chloride, ferric sulfate, and/or sodium bisulfate) to create a phosphorus-binding composition. In the preferred embodiment, the composition is applied to poultry litter, poultry bedding or other non-aqueous substrates that are at least partially comprised of animal manure. The composition binds with phosphorus to at least reduce the amount of phosphorus in runoff water or in leachate from fields fertilized with treated manure. The combining of the calcium silicate hydrate nanoparticles with the ammonia control products has a surprising and unexpected result. The calcium silicate hydrate-ammonia control material mix reduces soluble phosphorus more than either component of the mix alone.

17 Claims, 10 Drawing Sheets

(51) Int. Cl.
*B09B 3/25* (2022.01)
*C05F 3/00* (2006.01)

(56) References Cited

U.S. PATENT DOCUMENTS

| | | | | |
|---|---|---|---|---|
| 5,735,232 A | * | 4/1998 | Lang | C09K 3/32 |
| | | | | 119/171 |
| 5,914,104 A | * | 6/1999 | Moore, Jr. | A01K 1/0152 |
| | | | | 210/906 |
| 5,961,968 A | | 10/1999 | Moore, Jr. | |
| 7,438,815 B1 | * | 10/2008 | Moore, Jr. | A01C 3/00 |
| | | | | 210/753 |
| 9,434,624 B2 | | 9/2016 | Odom et al. | |
| 9,440,868 B2 | | 9/2016 | Odom et al. | |
| 10,246,346 B2 | | 4/2019 | Odom et al. | |
| 2012/0046165 A1 | * | 2/2012 | Lu | B01J 20/28085 |
| | | | | 502/406 |
| 2012/0103269 A1 | * | 5/2012 | Matsuo | A01K 1/0154 |
| | | | | 119/173 |
| 2015/0075439 A1 | * | 3/2015 | Sogou | A01K 1/0155 |
| | | | | 119/172 |

FOREIGN PATENT DOCUMENTS

| | | | | | |
|---|---|---|---|---|---|
| DE | 19839240 A1 | * | 3/2000 | | C09K 3/32 |
| DE | 202006020015 U1 | * | 9/2007 | | B01J 20/10 |
| DE | 202009008835 U1 | * | 10/2009 | | B01J 20/04 |
| EP | 1897436 A2 | * | 3/2008 | | C09K 3/32 |
| EP | 2724987 A1 | * | 4/2014 | | C05F 7/00 |
| WO | WO 2006/078176 A1 | * | 7/2006 | | C01B 33/24 |

* cited by examiner

COMPOSITION AND METHOD FOR REDUCING AMMONIA AND SOLUBLE PHOSPHORUS IN RUNOFF AND LEACHING FROM ANIMAL MANURE

REFERENCE TO RELATED APPLICATIONS

This application claims the benefit of U.S. Provisional Application No. 63/042,730, filed Jun. 23, 2020, which is incorporated herein by reference in its entirety.

FIELD OF THE INVENTION

The disclosed subject matter relates to a method and composition for controlling soluble phosphorus (P) and ammonia ($NH_3$). Specifically, the subject matter described herein relates to a composition and method for using ammonia control agents in combination with calcium silicate hydrate to control the ammonia volatilization from manure in poultry rearing facilities and to control soluble reactive phosphorus in runoff water and water leaching from the poultry manure.

BACKGROUND OF THE INVENTION

Although poultry litter is an excellent organic fertilizer, it typically has a low nitrogen (N) to phosphorus ratio relative to the nutrient needs of most crops. Over time, phosphorus builds up in fertilized soils and can be lost from the field in runoff water or leach downward into the groundwater. Unless it is appropriately treated, runoff from untreated poultry litter generally comprises a water-extractable form of phosphorus. Phosphorus runoff can be high, even when litter application rates are relatively low. The extractable phosphorus frequently causes eutrophication—which results in algal blooms in lakes and rivers and subsequent oxygen depletion One best management practice used to reduce phosphorus runoff from poultry litter is the addition of aluminum sulfate (commonly known in the art as "alum") to the litter. In 1994 the current inventor demonstrated that water extractable phosphorus (WEP) levels in the poultry litter were reduced from >2,000 mg P $kg^{-1}$ litter to <1 mg P $kg^{-1}$ litter with the addition of aluminum (Al), iron (Fe), and calcium (Ca) amendments. The current inventor also found that adding alum and ferrous sulfate to poultry litter reduced phosphorus concentrations from land fertilized with poultry litter by 87% to 77%, respectively, in a small plot study using rainfall simulators. Subsequent studies have shown that alum additions reduced phosphorus runoff by 75% from pastures fertilized with poultry litter. Treating poultry litter with alum has also been shown to reduce heavy metal (e.g. Arsenic, Copper and Zinc) and estrogen in runoff water from pastures fertilized with litter.

A key benefit of the addition of alum to poultry litter is the reduction of ammonia emissions. When alum is added to manure it acidifies the litter, thus lowering litter pH, which shifts the ammonia ($NH_3$)/ammonium ($NH_4^+$) equilibria towards ammonium, which is not volatile, thereby resulting in less ammonia ($NH_3$) volatilization. Lower ammonia levels in the poultry houses result in improved poultry performance, such as better weight gains and feed conversion and lower condemnation and mortality. Lower ammonia levels also reduce the need for ventilation during the winter—which reduces fossil fuel energy use and further reduces the greenhouse gasses emitted by poultry production operations.

The current inventor patented the use of alum to reduce ammonia emissions and phosphorus runoff from poultry litter, as described in U.S. Pat. Nos. 5,622,697, 5,914,104, and 5,961,968, which are hereby incorporated by reference. Those patents were licensed by General Chemical Corporation Inc. which marketed a litter amendment product comprising alum under the tradename "Al$^+$Clear"™. Because of the environmental and poultry production benefits, annually around four billion chickens nationwide are raised with poultry litter that has been treated with alum. Sodium bisulfate is another poultry litter amendment that has been widely used to reduce ammonia emissions, although it does not affect phosphorus runoff since it does not contain aluminum, calcium or iron. Sodium bisulfate is the primary active ingredient in the commercial product "Poultry Litter Treatment or PLT"™, which is produced by the Jones-Hamilton Company.

However, recently researchers have observed cases in which previously successful poultry litter amendments such as alum did not reduce soluble phosphorus and, on occasion, actually increased soluble phosphorus. One likely cause of the increase is the use of phytase enzymes, which are now commonly added to poultry diets. Phytate phosphorus (the organic form of phosphorus found in corn and soybeans) is unavailable to monogastric animals like chickens. When alum is added to poultry litter the aluminum is converted to aluminum hydroxide—which reacts with phytate to make an aluminum phytate mineral which is not soluble. Since phytase enzymes are now routinely added to animal diets, there is less phytate to bind with aluminum, so the previously effective mechanism of phosphorus reduction is now suppressed. Recently, the current inventor also found that alum did not reduce soluble phosphorus in poultry litter that had been previously treated with sodium bisulfate.

Therefore, the need exists for a poultry litter treatment that works in combination with ammonia control products, and binds with phosphorus and reduces the amount of soluble reactive phosphorus in runoff from animal manure. The composition and method described herein significantly reduces soluble reactive phosphorus by combining well-known ammonia reduction chemicals, such as alum or sodium bisulfate, with calcium silicate hydrate, preferably in a nanoparticle form.

When the calcium silicate hydrate nanoparticles are combined with alum or sodium bisulfate, there is a synergistic effect that surprisingly results in significantly lower soluble reactive phosphorus than one would expect. Specifically, when the calcium silicate hydrate nanoparticles are combined with alum or sodium bisulfate, the resulting compositions when used to treat poultry litter have a significantly lower amount of soluble reactive phosphorus than when poultry litter is treated with alum, sodium bisulfate, or calcium silicate hydrate nanoparticles alone.

SUMMARY OF THE INVENTION

This disclosure is directed to a phosphorus-binding composition comprising a calcium silicate hydrate material and traditional ammonia control materials. In the preferred embodiment, calcium silicate hydrate material comprises calcium silicate hydrate nanoparticles and the ammonia control materials comprise alum and/or sodium bisulfate. In operation, the calcium silicate hydrate nanoparticles and ammonia control materials are applied to poultry litter (i.e. a non-aqueous non-liquid substrate) comprising poultry manure and a bedding material, such as pine shavings or rice hulls. The combination of the calcium silicate hydrate nanoparticles and the ammonia control materials binds with the phosphorus and reduces the water soluble phosphorus in the litter which in turn reduces the amount of phosphorus in runoff water or leachate from fields fertilized with poultry litter. The combination of the calcium silicate hydrate nanoparticles and the ammonia control materials surprisingly creates a synergistic result that reduces phosphorus runoff significantly more than either the ammonia control materials or the calcium silicate hydrate nanoparticles alone.

BRIEF DESCRIPTION OF THE DRAWINGS

Definitions

Note that for brevity and clarity, multiple terms in FIGS. 1-10 have been shortened to concisely describe various materials and processes. Some relevant terms and definitions used in the current disclosure are as follows:

Figure 1:
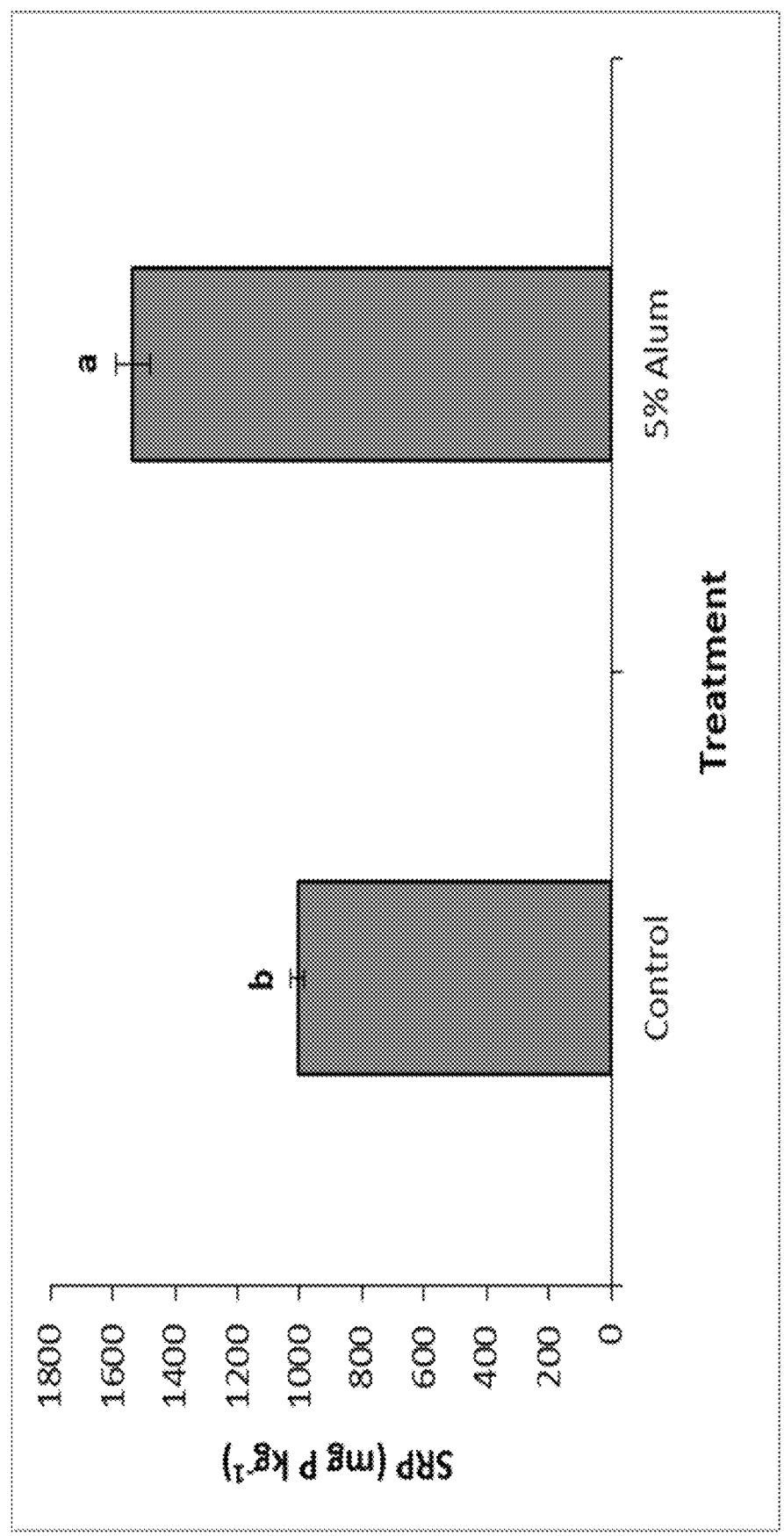

A phrase referring to "a control" refers to poultry litter than has not been treated with any chemical unless otherwise specified.

The phrase "an ammonia controlling material" refers to any chemical or other material applied to control ammonia emissions from poultry litter, animal bedding and/or other non-aqueous substrates that are at least partially comprised of animal manure litter. Non-limiting examples of the ammonia controlling material include alum, sodium bisulfate, ferric sulfate, ferric chloride, ferrous sulfate, ferrous chloride, aluminum chloride, potassium bisulfate, sulfuric acid, hydrochloric acid, nitric acid, and/or acetic acid or combinations thereof. The ammonia control material may also comprise an acidified industrial or agricultural waste product, such as but not limited to alum mud litter amendment (a combination of alum mud, bauxite, and sulfuric acid), acidified gypsum, acidified flue gas desulfurization materials, acidified flyash, acidified red mud, acidified biochar and/or mixtures thereof.

A "treated" poultry litter refers to litter that has been treated with an ammonia-treating material.

Unless otherwise specifically stated, the chemical/material concentration percentages or rates refer to an amount—by weight—of the chemical/material present. Specifically, the percentage concentration of a treatment chemical refers to about the amount (by weight) of the chemical added in relation to the amount (weight) of poultry litter that is being treated. For example, if 2 grams of alum were added to 20 grams of poultry litter then litter treatment would be called "10% alum".

An operator skilled in the art would know how much manure is present in an animal rearing facility, such as a poultry house, based on how many animals were grown for what length of time. For example, a typical broiler chicken will produce about one kilogram of poultry litter (which is a mixture of manure, bedding material, spilled feed and feathers) during a "growout" that lasts seven weeks. If 20,000 broilers are present in the poultry house then approximately 20,000 kg of poultry litter will be produced. A treatment of "10% alum and 1% calcium silicate nanoparticles" would mean that 2,000 kg of alum and 200 kg of calcium silicate nanoparticles would be applied to the 20,000 kg of litter. After application this material may or may not be mixed into the litter mechanically. It should be noted that before the litter is applied to fields, mixing of the chemicals with manure will occur by the birds scratching the litter surface. The litter and chemicals will also be mixed when the litter is cleaned out of the animal rearing facility using frontend loaders and later spread onto fields using manure spreaders.

The term "nonaqueous" means nonliquid. The term "substrate" means a base material that may be considered a material to be treated. Chemicals and other amending materials may be added to a substrate to modify and change the substrate. A "nonaqueous substrate" means a nonliquid base material.

The term "alum" refers to aluminum sulfate. The formula for alum is $Al_2(SO_4)_3 \cdot XH_2O$, where X can vary from 14 to 18.

The term "Sodium bisulfate" refers to $NaHSO_4$. As noted above, sodium bisulfate is the primary active ingredient in the commercial product PLT™ (Poultry Litter Treatment), which is manufactured by Jones-Hamilton. In the current disclosure, the sodium bisulfate used and described is primarily in the form of the commercial ammonia treatment product PLT™. However, generic forms of sodium bisulfate may be used and should also be considered within the scope of this disclosure.

The term "Ca-nano" refers to a nanoparticle made from calcium silicate hydrate. In the current disclosure, the calcium silicate hydrate nanoparticles used and described are primarily in the form of TPX™ nanoparticles which is manufactured by NClear Inc. of Atlanta, Georgia. However, generic forms of calcium silicate hydrate nanoparticles may be used and should also be considered within the scope of this disclosure. The calcium silicate hydrate nanoparticles in the form of TPX™ are discussed in greater detail infra.

The term "Al-nano" refers to aluminum nanoparticles. In the current disclosure, the aluminum nanoparticles used and described are primarily in the form of BOEHMITE™ ($AlOOH \cdot XH_2O$) nanoparticles that are manufactured by Skyspring Nanoparticles in Houston, TX However, generic forms of aluminum nanoparticles may be used and should also be considered within the scope of this disclosure.

The term "Fe-nano" refers to an iron oxide ($Fe_3O_4$) nanoparticles. In the current disclosure, the iron oxide nanoparticles used in the experiments are primarily in the form of the product #3320DX nanoparticles manufactured by Skyspring Nanoparticles in Houston, TX However, generic forms of iron oxide nanoparticles may be used and should also be considered within the scope of this disclosure.

The term "Fe—Mn-nano", or "magnetic nanoparticle" refers to an iron and manganese-based nanoparticles. In the current disclosure, the iron and manganese-based nanoparticles used and described are primarily in the form of MNP™ nanoparticles manufactured by Georgia Tech Research Institute. However, generic forms of iron and manganese-based nanoparticles may be used and should also be considered within the scope of this disclosure.

The term "Ferric Sulfate" is $Fe_2(SO_4)_3 \cdot XH_2O$. In the current disclosure, the ferric sulfate materials used and described are primarily in a generic form and are produced by Fisher Scientific Company at Fair Lawn, NJ However, other generic forms of ferric sulfate materials may be used and should also be considered within the scope of this disclosure.

The term "Calcium Chloride" refers to $CaCl_2 \cdot 2H_2O$. In the current disclosure, the calcium chloride is primarily in a generic form and is manufactured by Fisher Scientific Company at Fair Lawn, NJ However, other generic forms of calcium chloride may be used and should also be considered within the scope of this disclosure.

The term "gypsum" refers to $CaSO_4 \cdot 2H_2O$. In the current disclosure, the gypsum is primarily in a generic form and is manufactured by Fisher Scientific Company at Fair Lawn, NJ However, other generic forms of gypsum materials may be used and should also be considered within the scope of this disclosure.

FIG. 1 is a graphical representation showing the effect of alum on soluble reactive phosphorus in poultry litter that had been treated with sodium bisulfate for 10 flocks of broilers.

Figure 2:
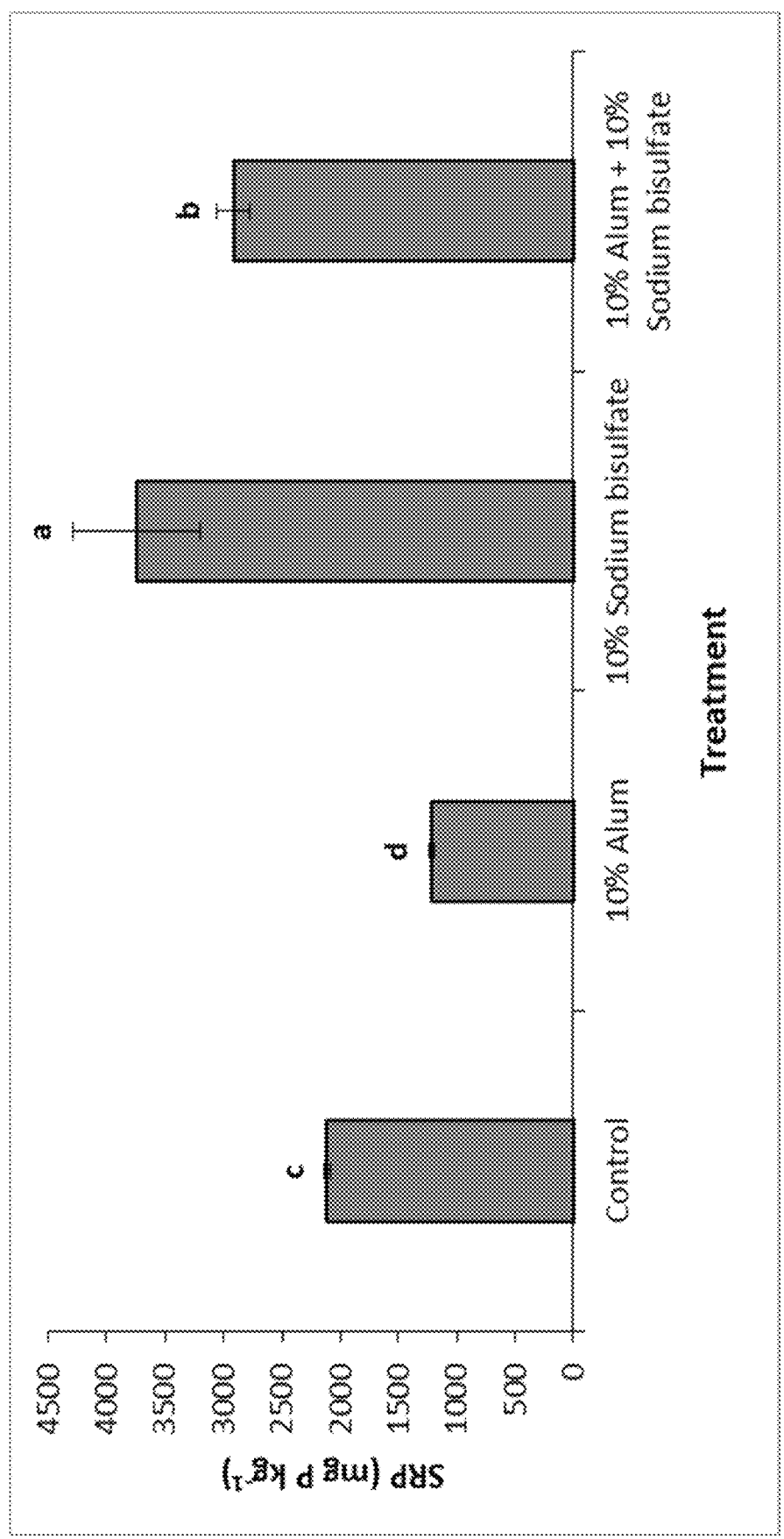

FIG. 2 is a graphical representation showing the effect of alum, sodium bisulfate, and alum combined with sodium bisulfate on soluble reactive phosphorus in poultry litter that had never been treated with sodium bisulfate.

Figure 3:
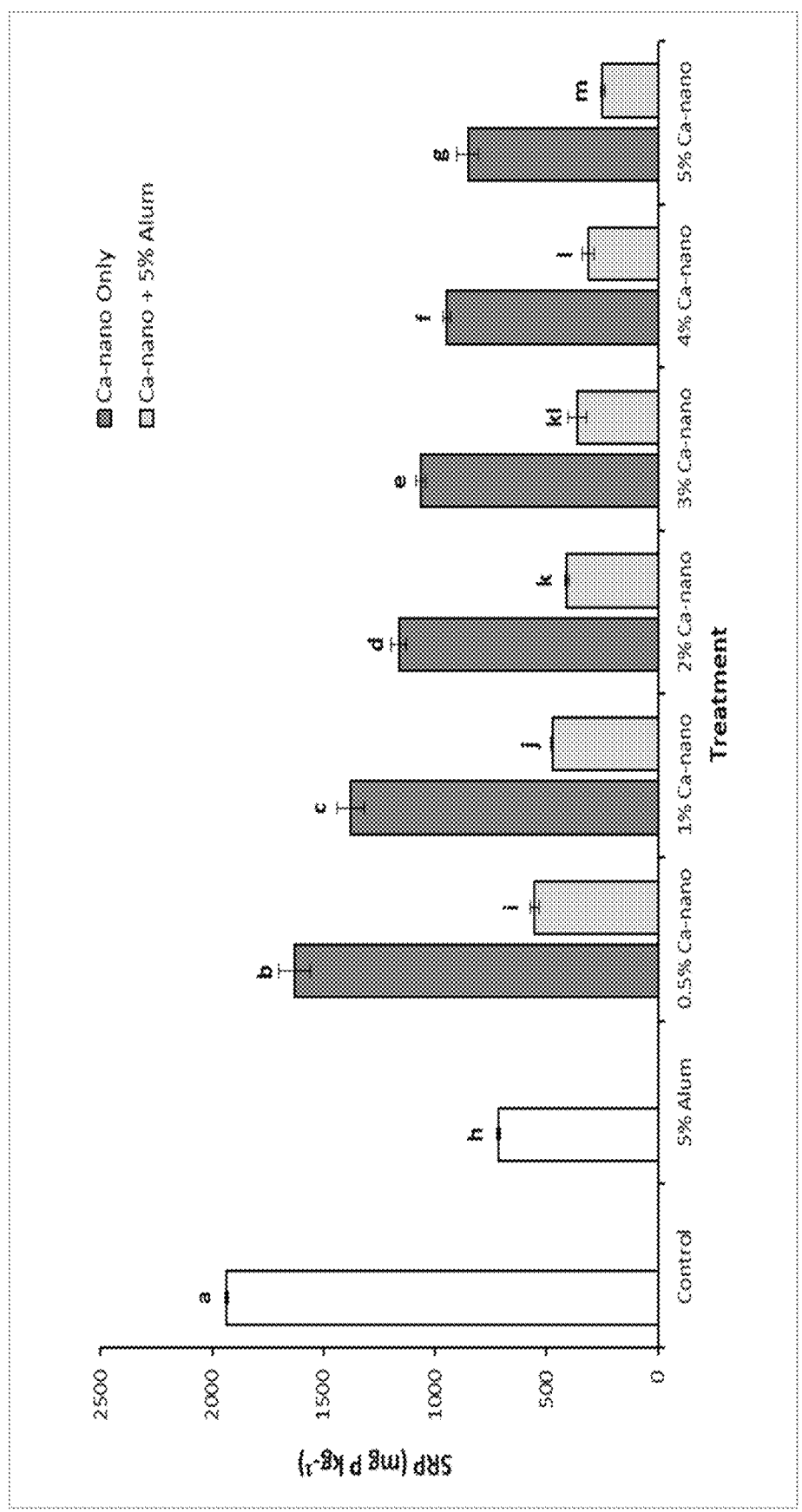

FIG. 3 is a graphical representation showing the effect on soluble reactive phosphorus of 5% alum (alone); various concentrations of calcium silicate hydrate nanoparticles (alone); and various concentrations of calcium silicate hydrate nanoparticles combined with 5% alum. The effects on soluble phosphorous are shown for poultry litter that had never been treated with sodium bisulfate.

Figure 4:
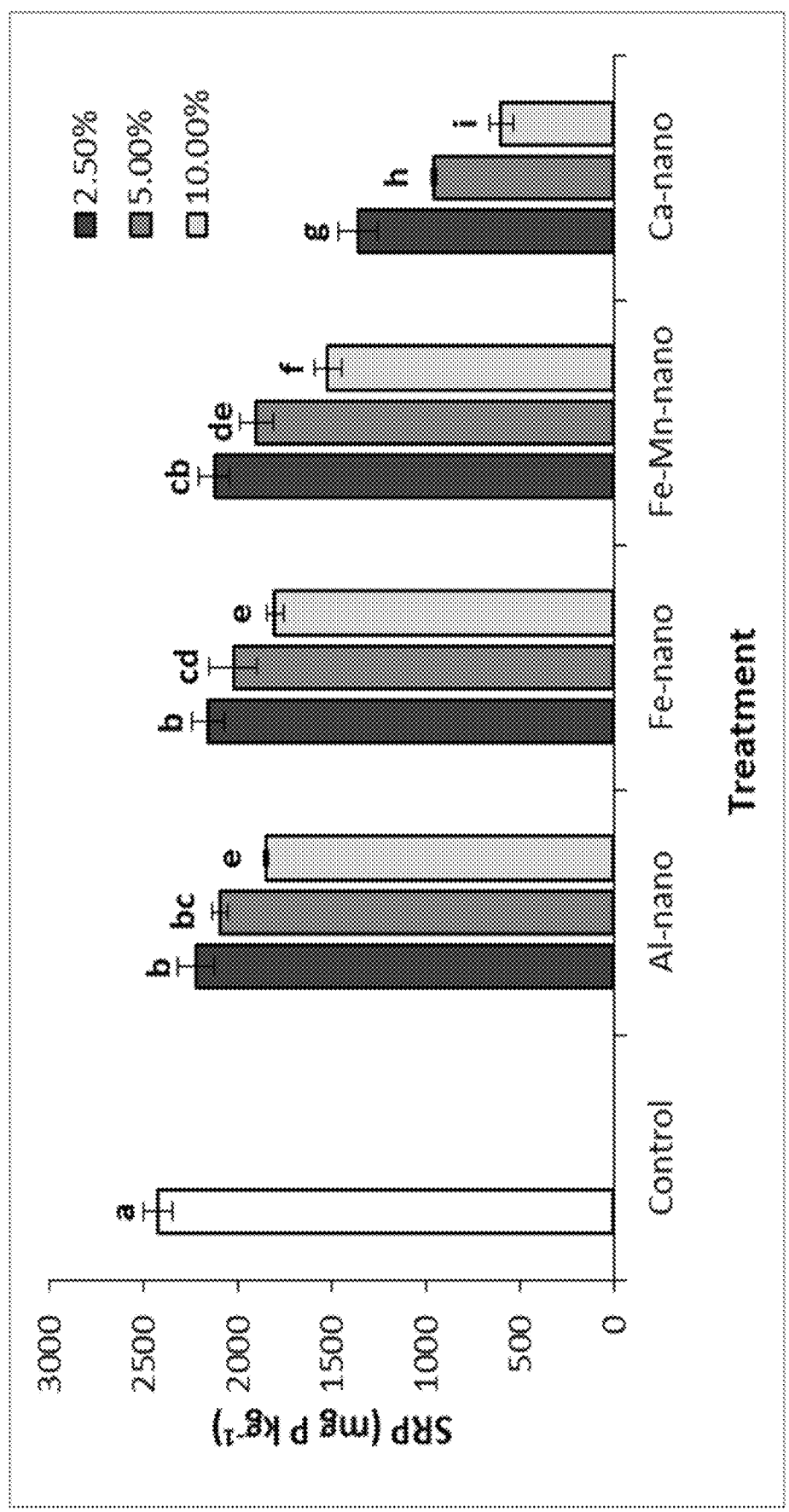

FIG. 4 is a graphical representation showing the soluble reactive phosphorus in poultry litter treated with 2.5%, 5%, and 10% aluminum nanoparticles, ferric nanoparticles, ferric-manganese nanoparticles, and calcium silicate hydrate nanoparticles in poultry litter that had never been treated with sodium bisulfate.

Figure 5:
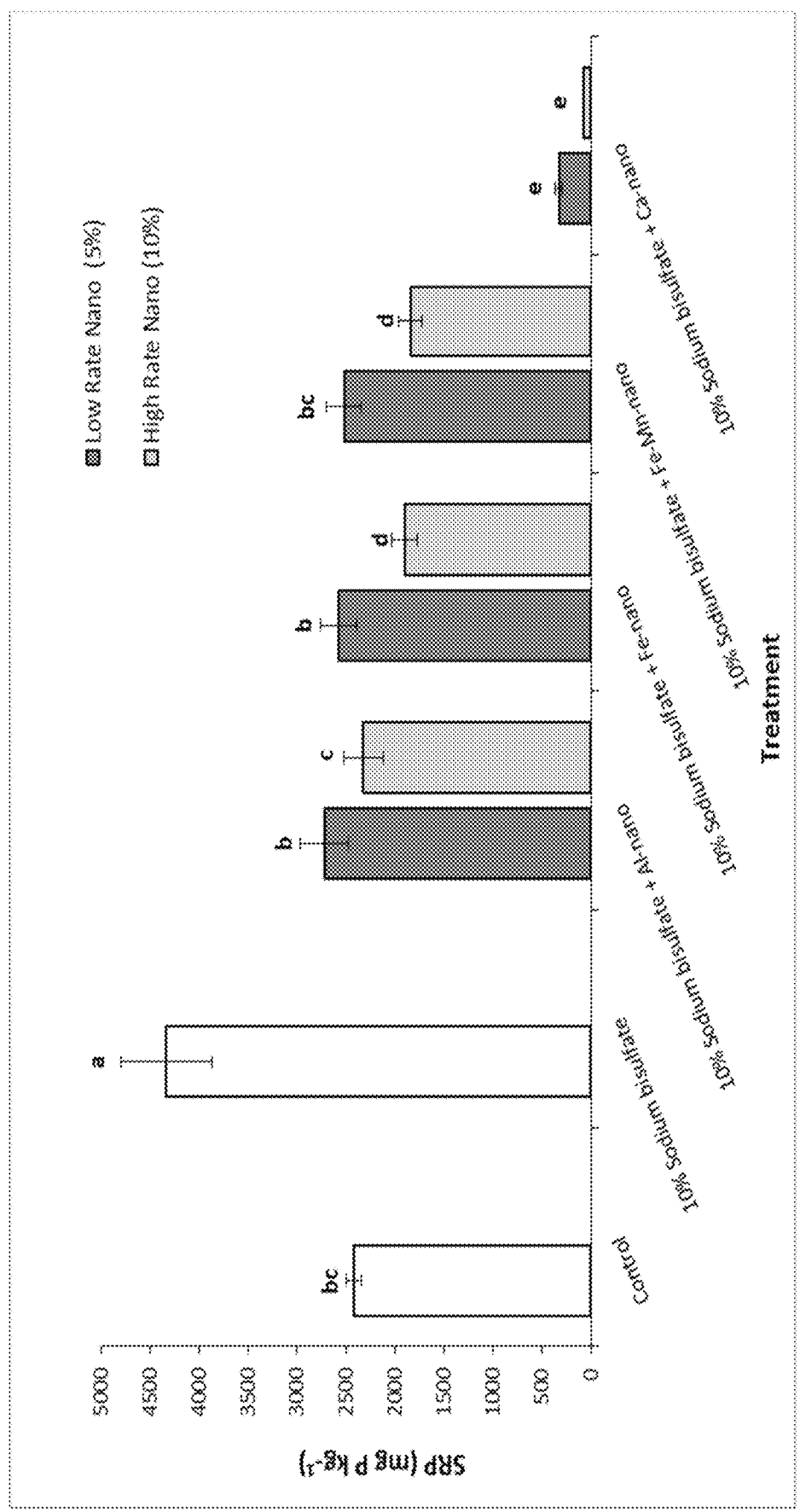

FIG. 5 is a graphical representation showing the soluble reactive phosphorus in poultry litter with and without sodium bisulfate treatment, and with sodium bisulfate plus low and high rates of aluminum nanoparticles, ferric nanoparticles, ferric manganese nanoparticles, and calcium silicate hydrate nanoparticles in poultry litter that had never been treated with sodium bisulfate.

Figure 6:
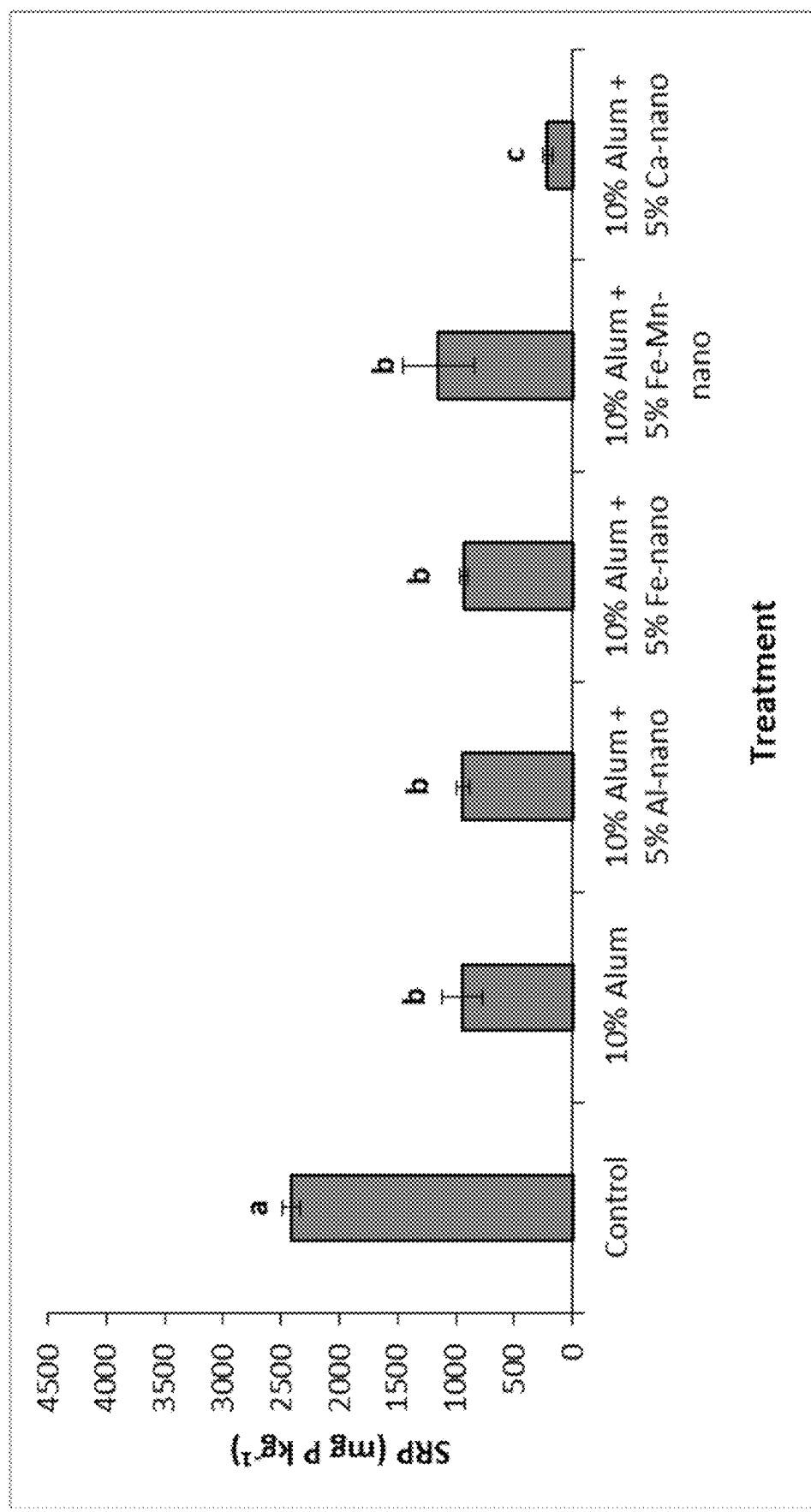

FIG. 6 is a graphical representation showing the soluble reactive phosphorus in poultry litter with and without 10% alum treatment and with alum plus aluminum nanoparticles, ferric nanoparticles, ferric manganese nanoparticles, and calcium silicate hydrate nanoparticles all at 5% in poultry litter that had never been treated with sodium bisulfate.

Figure 7:
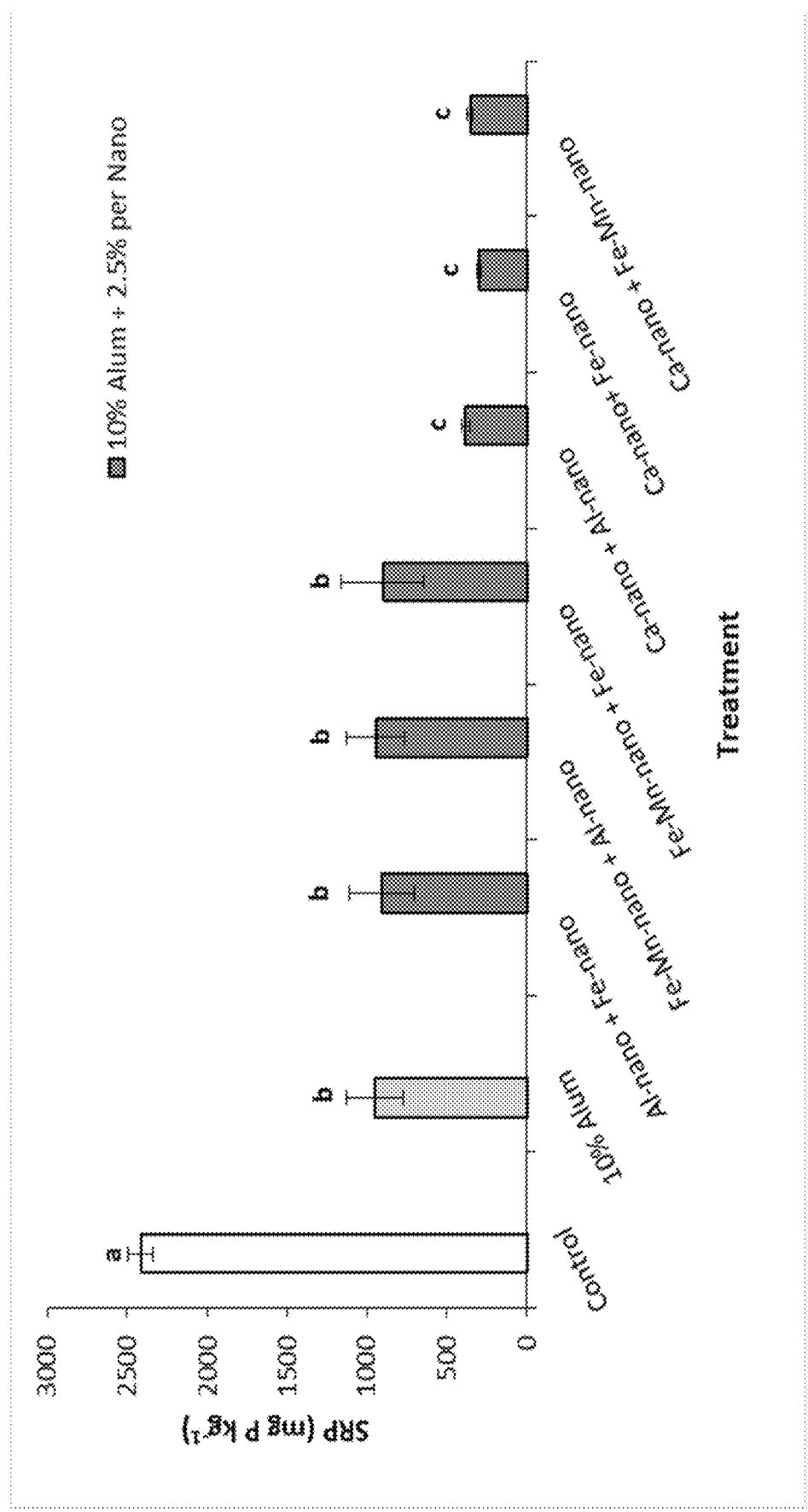

FIG. 7 is a graphical representation showing soluble reactive phosphorus concentrations in poultry litter treated with 10% alum (alone), or combinations of 10% alum and 2.5% of various mixtures of two types of nanoparticles in poultry litter that had never been treated with sodium bisulfate.

Figure 8:
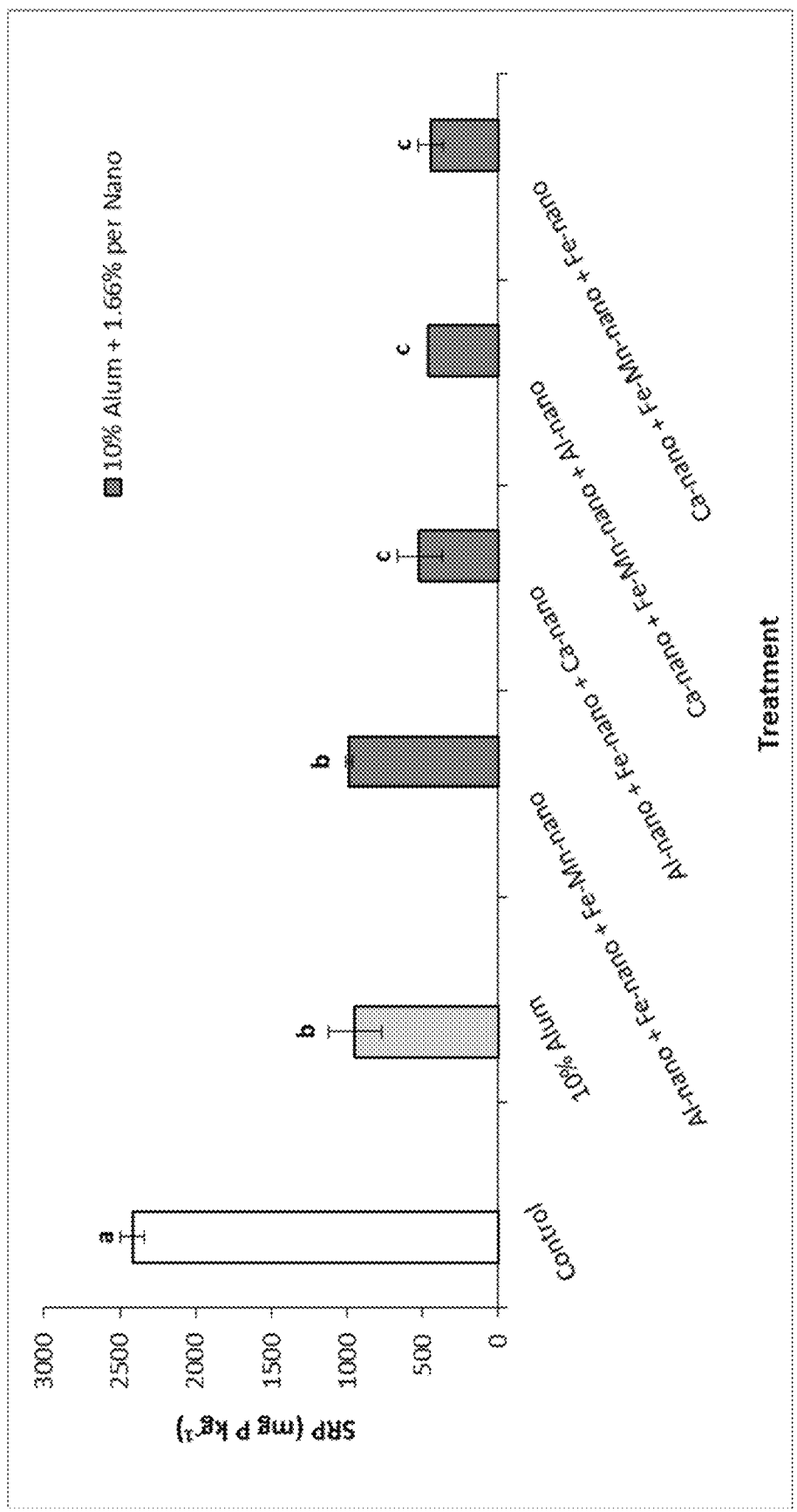

FIG. 8 is a graphical representation showing soluble reactive phosphorus concentrations in poultry litter treated with 10% alum (alone), or combinations of 10% alum and 1% of various mixtures of three types of nanoparticles in poultry litter that had never been treated with sodium bisulfate.

Figure 9:
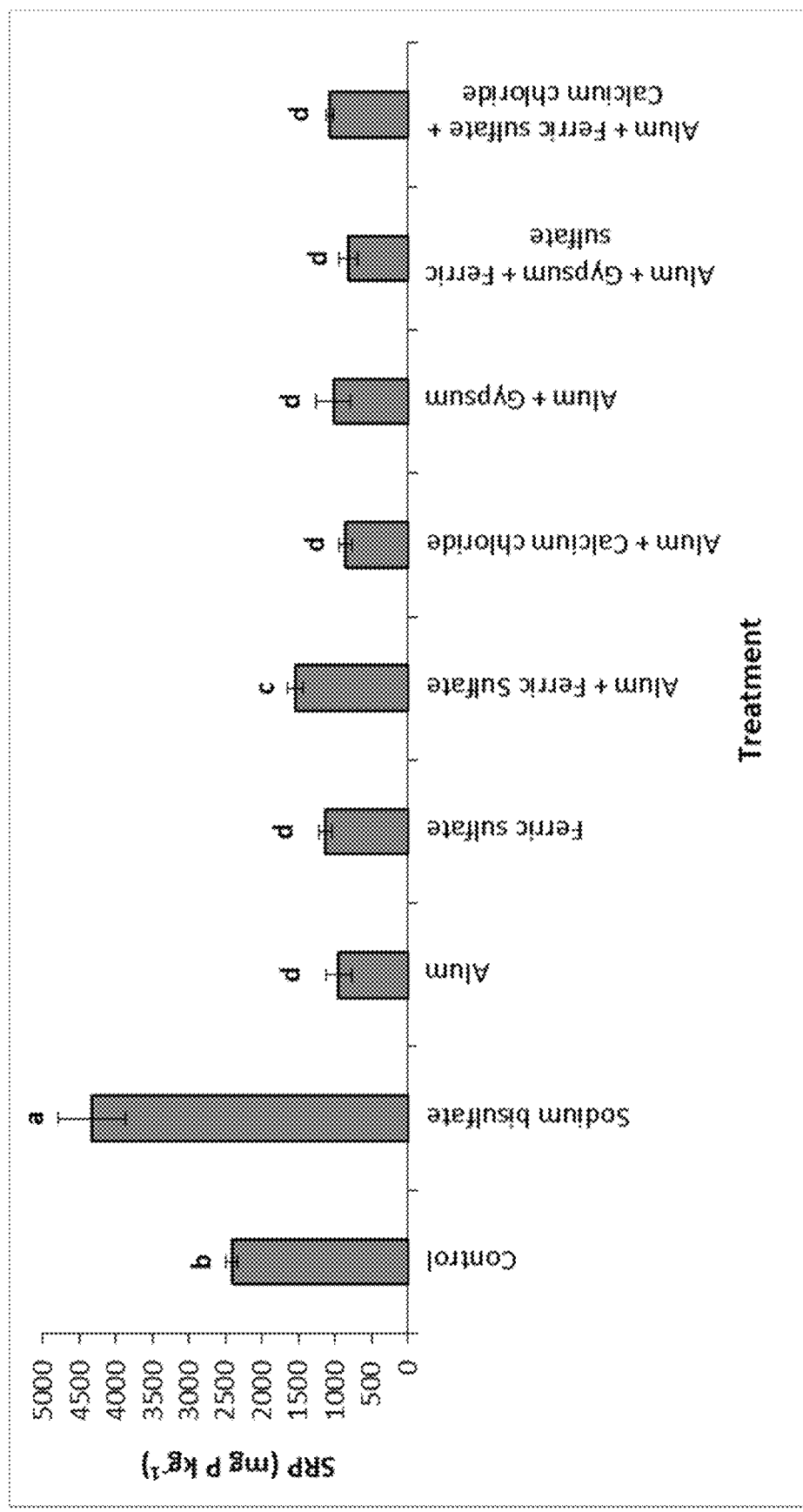

FIG. 9 is a graphical representation showing the effects of sodium bisulfate (alone), alum (alone), ferric sulfate (alone), and various aluminum, calcium and iron mixtures on soluble reactive phosphorus levels in poultry litter that had never been treated with sodium bisulfate.

Figure 10:
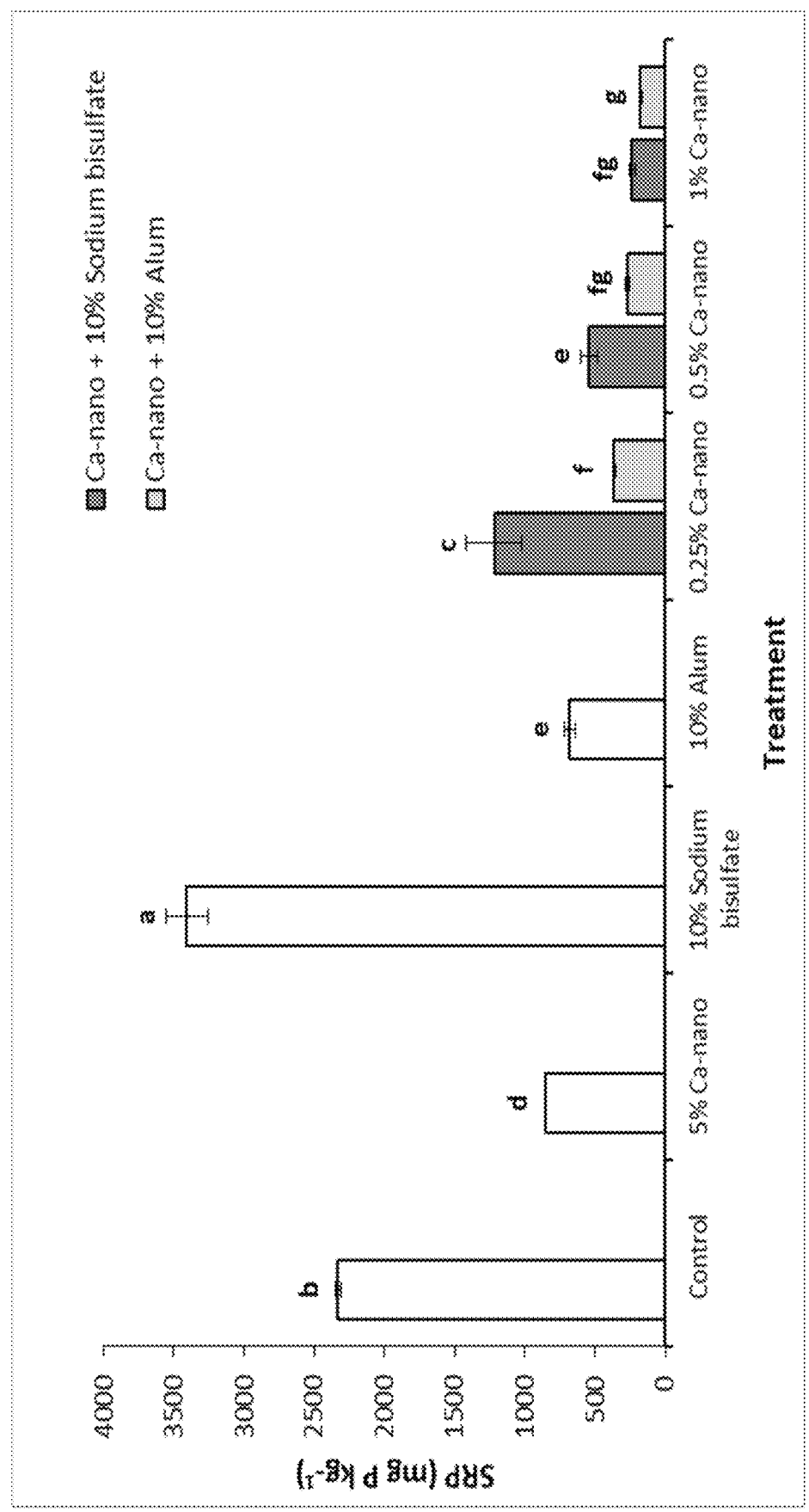

FIG. 10 is a graphical representation showing soluble reactive phosphorus concentrations in poultry litter treated with 5% calcium silicate hydrate nanoparticles (alone), 10% sodium bisulfate (alone), 10% alum (alone), and combinations of sodium bisulfate+calcium silicate hydrate nanoparticles and alum+calcium silicate hydrate nanoparticles in poultry litter that had never been treated with sodium bisulfate.

DETAILED DESCRIPTION OF PREFERRED EMBODIMENTS

As noted above, recently alum additions to poultry litter have not always resulted in the same reduction in soluble phosphorus as in the past. The inventor designed and conducted five primary research studies to investigate this issue. The objectives of the research studies were (among other things): (1) to determine why alum was no longer as effective in reducing soluble phosphorus in poultry litter; and, (2) to determine if the addition of (at least) aluminum, calcium, iron, and/or ferric-manganese nanoparticles would reduce soluble phosphorus. Specifically, the purpose of the research was to determine whether aluminum, calcium, iron or ferric-manganese, and/or calcium silicate hydrate nanoparticles—when applied alone or in combination with conventional litter treatments for ammonia control—would reduce soluble phosphorus.

Research Overview

The first study/series of experiments utilized poultry litter from a chicken house that had been treated with sodium bisulfate ten times over the past two years. As described supra, sodium bisulfate is the primary active ingredient in the ammonia control product PLT™.

The results of the first study are shown in FIG. 1. The results indicate that when 5% alum is added to sodium bisulfate-treated litter, the soluble phosphorus increased by 53%.

A second study was conducted to try to determine if the sodium bisulfate in the litter actually caused the increase in soluble phosphorus. In the second study, previously untreated litter was treated with 10% alum (alone), 10% sodium bisulfate (alone), and a combination of 10% alum and 10% sodium bisulfate.

The results of the second study are shown in FIG. 2. The results indicate that when alum was applied alone, the soluble phosphorus in the litter was reduced by 43% compared to the control. However, when sodium bisulfate was applied alone the soluble phosphorus in the litter actually increased by 77% relative to the untreated control. Soluble phosphorus increased by 38% when the litter was treated with a combination of 10% alum and sodium 10% bisulfate.

Without being bound by theory, the inventor suspects that the increase in soluble phosphorus is due to the formation of sodium alunite $[NaAl_3(OH)_6(SO_4)_2]$ in the litter. Sodium alunite is a mineral often found in acid soils treated with sulfate containing compounds, such as calcium sulfate. The formation of sodium alunite likely inactivates the aluminum with respect to phosphorus adsorption or precipitation, since phosphorus solubility was increased when alum was added to litter treated with sodium bisulfate, but decreased when sodium bisulfate was not added. Applications of sodium bisulfate alone also increased soluble phosphorous in litter.

In the third study, various concentrations of calcium silicate hydrate nanoparticles were applied to previously untreated poultry litter. Specifically, the calcium silicate hydrate nanoparticles were applied to untreated poultry litter alone in concentrations of between 0.5% and 5% by weight. The calcium silicate hydrate was also applied in the same concentrations in combination with 5% alum by weight.

The results of the third study are shown in FIG. 3. The surprising results indicate that there is a clear synergistic effect between calcium silicate hydrate nanoparticles (i.e. "Ca-nano") and alum, when compared to either alum alone or calcium silicate hydrate nanoparticles alone. As shown in FIG. 3, the most significant reduction in soluble reactive phosphorus occurred when the litter was treated with 5% of calcium silicate hydrate nanoparticles and 5% alum.

As noted supra, one example of a calcium silicate hydrate nanoparticle material is the commercial product TPX™. In the current disclosure, the calcium silicate hydrate nanoparticles are primarily in the form of the TPX™—although other forms of calcium silicate hydrate nanoparticles should be considered within the scope of the invention.

TPX™ is described in at least three US patents (U.S. Pat. Nos. 10,246,346, 9,434,624, and 9,440,868), which are hereby incorporated by reference. TPX™ is a non-toxic nanocrystal chemical compound (base structure of $CaxSixO2.83x(OH)0.33x$) consisting of calcium silicate hydrates (C—S—H) and amorphous soluble chemicals. TPX™ was designed to bond with soluble reactive phosphorus in aqueous solutions—which usually comprise various forms of industrial and municipal wastewater. However, in the current disclosure the inventor combines TPX™ (or a generic calcium silicate hydrate-based nano-particle equivalent) with ammonia control materials and applies that mixture to manure. As shown in (at least) FIG. 3 and described herein, the inventor found that the combination yielded unexpected and surprising results in reducing soluble reactive phosphorus.

FIGS. 4-9 show the results of the fourth study. In the fourth study/experiment, poultry litter is treated with multiple chemicals and combinations of chemicals. A listing of the chemicals and the various results are shown in Table 1 discussed infra. FIG. 4 shows the results of treating poultry litter with 2.5%, 5%, and 10% aluminum nanoparticles, iron nanoparticles, a combination iron and manganese nanoparticles, and calcium silicate hydrate nanoparticles.

As graphically shown in FIG. 4, the aluminum and iron nanoparticles respectively were (at best) marginally effective in reducing soluble phosphorus. At the 2.5% and 5% levels the ferric-manganese nanoparticles were also only marginally effective, but at the 10% level, the ferric-manganese nanoparticles noticeably reduced the amount of soluble phosphorus. However, surprisingly there was a significant decrease in soluble phosphorus for all (2.5%, 5%, and 10%) levels of calcium silicate hydrate nanoparticles. For example, for a 10% calcium silicate hydrate nanoparticle mixture, soluble phosphorus was reduced by about 80% relative to the control.

FIG. 5 shows the results of 10% sodium bisulfate applied alone or applied with varying amounts (5 or 10%) of selected nanoparticles. Among other things, FIG. 5 shows the effect of a sodium bisulfate-nanoparticle mix on soluble reactive phosphorus.

Specifically, poultry litter was treated with 10% sodium bisulfate combined with low (5%) and high (10%) amounts of: aluminum nanoparticles, ferric nanoparticles, ferric-manganese nanoparticles, and calcium silicate hydrate nanoparticles. The results of these measurements were compared to a control (comprising untreated poultry litter) and poultry litter that had been treated with sodium bisulfate alone.

As shown in FIG. 5, the litter treated with a sodium bisulfate-nanoparticle mix resulted in significantly lower soluble reactive phosphorus than litter treated with sodium bisulfate alone. However, for the aluminum, ferric, and ferric-manganese nanoparticles, the 5% nanoparticle mix resulted in slightly more soluble phosphorus than the untreated control, and the 10% nanoparticle mix resulted in slightly less soluble phosphorus than was present in the (untreated) control. However, both the high and the low calcium silicate hydrate nanoparticle mix resulted in significantly (and unexpectedly) lowered amounts of soluble reactive phosphorus.

These results indicate that, in general, merely using a nanoparticle material in combination with sodium bisulfate would not significantly reduce soluble phosphorus in runoff water from treated litter. However, surprisingly the combination of sodium bisulfate and calcium silicate hydrate does significantly reduce soluble phosphorus in litter, indicating that it would reduce phosphorus runoff and leaching from litter that is used as fertilizer. As shown in FIG. 5, 10% sodium bisulfate in combination with 10% calcium silicate hydrate nanoparticles surprisingly reduced soluble phosphorus by more than 90% relative to the control, even though sodium bisulfate greatly increased soluble phosphorus when applied alone.

FIG. 6 shows the results of applying 10% alum to untreated poultry litter either alone or in combination with 5% of selected nanoparticles. Among other things, FIG. 6 shows the effect of an alum-nanoparticle mix on soluble reactive phosphorus.

Specifically, poultry litter was treated with 10% alum combined with (individually) 5% aluminum nanoparticles, ferric nanoparticles, ferric-manganese nanoparticles, and calcium silicate hydrate nanoparticles. The results of these measurements were compared to a control (comprising untreated poultry litter) and poultry litter that had been treated with 10% alum alone.

As shown in FIG. 6, a combination of 10% alum (alone), and individually with 5% aluminum and iron nanoparticles did not significantly lower soluble reactive phosphorus compared to 10% alum alone. The combination of alum and ferric-manganese nanoparticles actually slightly increased soluble reactive phosphorus, although that increase was not statistically significant. However, (similar to the results in the data shown in FIG. 5 with respect to sodium bisulfate) surprisingly the combination of alum and calcium silicate hydrate nanoparticles significantly lowered soluble phosphorus. FIG. 6 graphically presents these results relative to a control comprising untreated litter, and litter treated only with 10% alum.

The data shown in FIG. 6 complements the results/data shown in FIG. 5. Both figures show that calcium silicate hydrate nanoparticles combined with ammonia control products (e.g. alum and sodium bisulfate) surprisingly lower soluble phosphorus. The combination of ammonia control products and other tested nanoparticle additives have not had the same effect. Specifically, the combination of aluminum, ferric, and ferric-manganese nanoparticles with alum or PLT have not significantly lowered soluble phosphorus solubility in poultry litter.

Like FIG. 6, FIGS. 7 and 8 show combinations of nanoparticles and alum. In FIG. 7, alum is mixed with selected pairs of nanoparticles and the mixtures are applied to poultry litter to determine the effect of the alum-nanoparticle mix on soluble phosphorus. In FIG. 8, three types of nanoparticles are combined with alum for the same purpose.

Specifically, in FIG. 7, the treatment of poultry litter with 10% alum is combined with the treatment of 2.5% of each type of nanoparticle, the nanoparticles include: (1) aluminum and ferric nanoparticles; (2) ferric-manganese and aluminum; (3) ferric-manganese and ferric nanoparticles; (4) calcium silicate hydrate and aluminum nanoparticles; (5) calcium silicate hydrate and ferric nanoparticles; and, (6) calcium silicate hydrate and ferric-manganese nanoparticles.

In FIG. 8, a 10% alum treatment is combined a treatment of 1.6% of each type of three types of nanoparticles. The types of nanoparticles include: (1) aluminum, ferric, and ferric manganese nanoparticles; (2) aluminum, ferric, and calcium silicate hydrate; (3) calcium silicate hydrate, ferric-manganese, and aluminum nanoparticles; (4) calcium silicate hydrate, ferric-manganese, and ferric nanoparticles.

FIGS. 7 and 8 show that combinations of alum and various nanoparticle mixes (other than calcium silicate hydrate) had no significant effect on soluble phosphorus relative to alum alone. However, in all mixes that included calcium silicate hydrate, surprisingly the soluble reactive phosphorus was significantly decreased.

FIG. 9 shows the soluble phosphorus resulting from applying various non-nanoparticle materials to untreated poultry litter. The materials shown in FIG. 9 have been previously used or suggested as poultry litter treatment materials. Specifically, the materials include: (1) sodium bisulfate; (2) alum; (3) ferric sulfate; (4) an alum and ferric sulfate mix; (5) an alum and calcium chloride mix; (6) an alum and gypsum mix; (7) an alum, gypsum, and ferric sulfate mix: and, (8) an alum, ferric sulfate, and calcium chloride mix.

As shown in FIG. 9, with the exception of sodium bisulfate, all of the materials significantly reduced soluble phosphate relative to the untreated litter control. However, none of the mixtures were able to reduce soluble phosphorus lower than the levels achieved by alum alone or the 10% sodium bisulfate—10% calcium silicate hydrate mix (per FIG. 5), or the 10% alum—5% calcium silicate hydrate mix (per FIG. 6).

FIG. 10 graphically shows the results of mixing relatively low concentrations of calcium silicate hydrate (0.25%, 0.50%, and 1% by weight) with 10% sodium bisulfate and 10% alum respectively. These results are shown relative to 5% calcium silicate hydrate (alone), 10% sodium bisulfate (alone), and 10% alum (alone).

Surprisingly, all but one of the calcium silicate hydrate mixes resulted in lower soluble phosphorous in the litter than 5% calcium silicate hydrate, 10% sodium bisulfate, or 10% alum. This unexpectedly indicates a synergistic result between the calcium silicate hydrate and the well-known ammonia control products (alum and sodium bisulfate).

EXPERIMENTS/STUDIES

Experiment 1—Effect of Alum on Soluble Phosphorus in Poultry Litter which had been Treated with Sodium Bisulfate for Ten Flocks of Broilers Objective: Determine the effects of alum on soluble phosphorus levels in poultry litter from a commercial broiler house which had been treated with sodium bisulfate.

Justification: During the past couple of years alum additions no longer appear to consistently reduce soluble phosphorus. Often times when alum did not reduce soluble phosphorus in the litter the growers at the farm where the inventor sampled the poultry litter told him that the litter had been treated with sodium bisulfate. Sodium bisulfate is sold as the product Poultry Litter Treatment (PLT™) by Jones-Hamilton. It is used to control ammonia in chicken houses. The inventor hypothesized that the poor reduction in soluble phosphorus was due to some kind of interference in phosphate precipitation or adsorption reactions with aluminum. Hence, litter was collected from the University of Arkansas Savoy Farm. This farm has four commercial broiler houses. The litter had not been cleaned out of these houses during the past two years when ten flocks of birds had been grown. The litter of these flocks had been treated with sodium bisulfate between each flock.

Hypothesis: Litter treated with sodium bisulfate inhibits the reduction in soluble phosphorus by alum additions.

Materials and Methods

Twenty grams of fresh, sieved litter were weighed into six 250 ml centrifuge tubes. There were two treatments and three reps per treatment. The treatments were a control and the addition of 5% alum by weight. Twenty grams of litter were weighed into large plastic weighing pans. Alum was then surface applied as uniformly as possible with a spatula, then mixed into the litter. The samples were then incubated in the dark at room temperature for 3 days. After incubation, the samples were extracted with 200 ml of deionized (DI) water for one hour, centrifuged at 8,000 rpm for 20 minutes and filtered through 0.45 um filter paper.

The filtered sample was acidified to pH 2 with hydrochloric acid and soluble reactive phosphorus was measured with the Murphy-Riley method using an auto-analyzer.

Remarks/Comments

Soluble reactive phosphorus concentrations for untreated and alum-treated litter are shown in FIG. 1. Rather than decreasing soluble phosphorus, the addition of alum to this litter actually caused a 53% increase in soluble reactive phosphorous (from 1006 to 1536 mg P/kg) strongly indicating that sodium bisulfate (in the form of PLT™) does, in fact, inhibit the precipitation or adsorption reactions that normally occur when alum is added to poultry litter that result in a reduction in soluble phosphorus. Without being bound by theory, the increase in soluble phosphorus due to alum additions is likely due to a reduction in pH below 7, which would result in the dissolution of calcium phosphate minerals present in the litter, and the inhibition of aluminum phosphate precipitation or adsorption reactions after PLT has been added due to the formation of sodium alunite that tied up the aluminum from alum in a non-reactive form.

Experiment 2—Effect of Alum on Soluble Phosphorus in Poultry Litter with or without Sodium Bisulfate Objective: Determine the effects of alum on soluble phosphorus levels in poultry litter with or without the addition of sodium bisulfate.

Justification: Experiment 1 indicated that sodium bisulfate may inhibit aluminum phosphate precipitation. In order to prove whether this is indeed a cause and effect relationship, untreated litter from a recent pen trial was utilized for this experiment.

Hypothesis: Poultry litter treated with sodium bisulfate inhibits the reduction in soluble phosphorus by alum additions.

Materials and Methods

Twenty grams of fresh, sieved litter from a recent pen trial were weighed into 12 centrifuge tubes (250 ml). There were four treatments with three reps per treatment. The treatments are a control, 10% alum, 10% PLT™ (sodium bisulfate), and 10% alum+10% PLT™ twenty grams of litter were weighed into a large plastic weighing pan. The alum and PLT™ were then surface applied as uniformly as possible with a spatula, then mixed into the litter. The samples were then incubated in the dark inside a cabinet at room temperature for 3 days. After incubation, the samples were extracted and analyzed for soluble reactive phosphorous as before.

Remarks/Comments

The litter used for this experiment had not been treated with PLT. When alum alone was applied it reduced soluble reactive phosphorous by 43% (from 2,113 to 1,212 mg P/kg) compared to the control (FIG. 2). The addition of PLT™ alone increased PLT™ by 77% (from 2,113 to 3,743 mg/kg). This is likely due to the dissolution of calcium phosphates at pHs below 7, plus the lack of soluble calcium, iron, or aluminum to tie up that phosphorous that had been released. Soluble reactive phosphorous was increased by 38% when alum was applied in combination with PLT™. The inventor hypothesized that the mechanism for alum inactivation with respect to reducing soluble phosphorous is the formation of sodium alunite. This mineral is known to form in soils when sulfates are added.

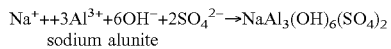
$$Na^+ + 3Al^{3+} + 6OH^- + 2SO_4^{2-} \rightarrow NaAl_3(OH)_6(SO_4)_2$$
sodium alunite Since the aluminum is tied up as this mineral phase it is less reactive with respect to phosphorous. Hence, alum additions do not lower soluble phosphorous. It is not unusual for poultry producers to treat litter with two different ammonia control chemicals to provide cost-share funding for ammonia control products in winter. Cost-sharing for products that protect water quality, like alum, is also provided by US Department of Agriculture, Natural Resources Conservation Service (USDA/NRCS). Growers typically have a favorite product for ammonia control which may or may not be the same product that cost are shared by the company or USDA/NRCS. Since the same bedding material is often used for years (5 to 15 flocks) it is possible to have more than one product being applied to the litter.

Experiment 3—Effect of Alum and TPX™ Nanoparticles on Soluble Phosphorus in Poultry Litter Objective: Determine the Effects of TPX™ and Alum on Soluble Phosphorus Levels in Poultry Litter Justification: TPX™ is used to remove soluble reactive phosphorus from wastewaters in poultry processing plants. This study will determine if TPX™ reduces soluble phosphorus in poultry litter. TPX™ is not acidic, so it probably will not reduce ammonia volatilization from litter; hence, it is doubtful there is an economic benefit of this product when applied alone. However, it may be possible that mixtures of TPX™ and ammonia control products, like alum or PLT™, would be beneficial because they may result in both reductions in soluble phosphorus and ammonia volatilization.
Materials and Methods Twenty grams of fresh, sieved litter was weighed out into 45 centrifuge tubes (250 ml). There was a control and 14 additional treatments with three reps/treatment. The treatments were: (1) untreated litter (control), (2) TPX™ at rates of 0.5, 1, 2, 3, 4, and 5% by weight, (3) alum at 2.5 and 5%, and (4) 5% alum with TPX™ at 0.5, 1, 2, 3, 4, and 5%. Twenty grams of litter were weighed into a large plastic weighing pan. The alum and/or TPX™ were then surface applied as uniformly as possible with a spatula, then mixed into the litter. The samples were then incubated in the dark inside a cabinet at room temperature for 6 days. After incubation, the samples were extracted and analyzed for soluble reactive phosphorous as before.
Remarks/Comments The litter used from this study was from a pen trial conducted by the inventor's organization and had not been treated with any litter amendments. Additions of 2.5 and 5.0% alum lowered soluble phosphorus from 1935 mg P/kg to 1479 and 886 mg P/kg, respectively (FIG. 3). Although this much reduction by alum was typical 10 to 20 years ago, it was a somewhat surprising because in the past few years alum additions did not work as well as in the past and, in fact, sometimes resulted in increases in soluble reactive phosphorus as found in experiment 1. Additions of TPX™, the calcium based nanoparticle, also reduced soluble phosphorus. When mixed with alum, TPX™ had a synergistic effect on soluble phosphorus reduction. It should be noted that most soils in the southeastern US where broiler chickens are grown are slightly acid to acid. Under these conditions calcium phosphate minerals are not stable and will dissolve; that is why calcium phosphate is used for phosphorous fertilizers. However, the makers of TPX™ have stated that the phosphorous mineral formed with this nanoparticle is very stable at low pHs.

Experiment 4—Effect of Conventional Chemical Additives and Nanoparticles on Soluble Phosphorus in Poultry Litter Objective: Determine the effects of various chemicals on soluble phosphorus in poultry litter.

Justification: Recent studies indicate that poultry litter treated with PLT™ has an inhibitory effect on soluble phosphorous reduction by alum. Hence, new products or a combination of products, including nanoparticles, may be needed to reduce soluble phosphorus and ammonia emissions from litter.
Materials and Methods This was a simple laboratory incubation study using litter from a recent pen trial. Twenty grams of fresh litter were weighed into 144 centrifuge tubes (250 ml). There were 48 treatments and 3 reps/treatment. The results of the treatments are shown in Table 1:

TABLE 1

| # | Treatment | Litter (g) | Primary (g) | Secondary (g) | Tertiary (g) | Quant (g) |
|---|---|---|---|---|---|---|
| 1 | Control - untreated poultry litter | 20 | 0 | 0 | 0 | 0 |
| 2 | NaHSO4-2 g | 20 | 2 | 0 | 0 | 0 |
| 3 | NaHSO4-2 g + alum-1 g | 20 | 2 | 1 | 0 | 0 |
| 4 | NaHSO4-2 g + alum-2 g | 20 | 2 | 2 | 0 | 0 |
| 5 | NaHSO4-2 g + Ferric sulfate-1.2 g | 20 | 2 | 1.2 | 0 | 0 |
| 6 | NaHSO4-2 g + TPX-1 g | 20 | 2 | 1 | 0 | 0 |
| 7 | NaHSO4-2 g + TPX-2 g | 20 | 2 | 2 | 0 | 0 |
| 8 | NaHSO4-2 g + Al Nan-50 | 20 | 2 | 1 | 0 | 0 |
| 9 | NaHSO4-2 g + Al Nan-100 | 20 | 2 | 2 | 0 | 0 |
| 10 | NaHSO4-2 g + Fe nan-50 | 20 | 2 | 1 | 0 | 0 |
| 11 | NaHSO4-2 g + Fe Nan-100 | 20 | 2 | 2 | 0 | 0 |
| 12 | NaHSO4-2 g + MPN-50 | 20 | 2 | 1 | 0 | 0 |
| 13 | NaHSO4-2 g + MPN-100 | 20 | 2 | 2 | 0 | 0 |
| 14 | alum-2 g | 20 | 2 | 0 | 0 | 0 |
| 15 | Ferric Sulfate-1.2 g | 20 | 1.2 | 0 | 0 | 0 |
| 16 | Calcium chloride-1.2 g | 20 | 1.2 | 0 | 0 | 0 |
| 17 | Ferric Sulfate-1.2 g + Alum-2 g | 20 | 1.2 | 2 | 0 | 0 |

TABLE 1-continued

| # | Treatment | Litter (g) | Primary (g) | Secondary (g) | Tertiary (g) | Quant (g) |
|---|---|---|---|---|---|---|
| 18 | Ferric Sulfate-1.2 g + Alum-2 g + CaCl2-1.2 g | 20 | 1.2 | 2 | 1.2 | 0 |
| 19 | Alum-2 g + calcium chloride-1.2 g | 20 | 2 | 1.2 | 0 | 0 |
| 20 | Alum-2 g + Gypsum-1.2 g | 20 | 2 | 1.2 | 0 | 0 |
| 21 | Alum-1 g + Gypsum-1 g + Ferric Sulfate-0.6 g | 20 | 1 | 1 | 0.6 | 0 |
| 22 | Fe-Nan-0.5 g | 20 | 0.5 | 0 | 0 | 0 |
| 23 | Fe-Nan-1.0 g | 20 | 1 | 0 | 0 | 0 |
| 24 | Fe-Nan-2.0 g | 20 | 2 | 0 | 0 | 0 |
| 25 | Al-Nan-0.5 g | 20 | 0.5 | 0 | 0 | 0 |
| 26 | Al-Nan-1.0 g | 20 | 1 | 0 | 0 | 0 |
| 27 | Al-Nan-2.0 g | 20 | 2 | 0 | 0 | 0 |
| 28 | TPX-0.5 g | 20 | 0.5 | 0 | 0 | 0 |
| 29 | TPX-1.0 g | 20 | 1 | 0 | 0 | 0 |
| 30 | TPX-2 g | 20 | 2 | 0 | 0 | 0 |
| 31 | MNP-0.5 g | 20 | 0.5 | 0 | 0 | 0 |
| 32 | MNP-1.0 g | 20 | 1 | 0 | 0 | 0 |
| 33 | MNP-2.0 g | 20 | 2 | 0 | 0 | 0 |
| 34 | Alum-2 g + Al-Nan-1 g | 20 | 2 | 1 | 0 | 0 |
| 35 | Alum-2 g + Fe-Nan-1 g | 20 | 2 | 1 | 0 | 0 |
| 36 | Alum-2 g + TPX-1 g | 20 | 2 | 1 | 0 | 0 |
| 37 | Alum-2 g + MPN-1 g | 20 | 2 | 1 | 0 | 0 |
| 38 | Alum-2 g + MNP-0.5 g + Al-Nan-0.5 | 20 | 2 | 0.5 | 0.5 | 0 |
| 39 | Alum-2 g + Fe-Nan-0.5 g + MNP-0.5 g | 20 | 2 | 0.5 | 0.5 | 0 |
| 40 | Alum-2 g + Al-Nan-0.5 g + Fe Nan-0.5 g | 20 | 2 | 0.5 | 0.5 | 0 |
| 41 | Alum-2 g + TPX-0.5 g + Fe-Nan-0.5 | 20 | 2 | 0.5 | 0.5 | 0 |
| 42 | Alum-2 g + TPX-0.5 g + MNP-0.5 g | 20 | 2 | 0.5 | 0.5 | 0 |
| 43 | Alum-2 g + TPX-0.5 g + Al-Man-0.5 g | 20 | 2 | 0.5 | 0.5 | 0 |
| 44 | Alum-2 g + Al-Nan + MPN + Fe-Nan | 20 | 2 | 0.5 | 0.5 | 0 |
| 45 | Alum-2 g + Al-Nan + MPN + TPX | 20 | 2 | 0.33 | 0.33 | 0.33 |
| 46 | Alum-2 g + Al-Nan + Fe-Nan + TPX | 20 | 2 | 0.33 | 0.33 | 0.33 |
| 47 | Alum-2 g + MNP + Fe-Nan + TPX | 20 | 2 | 0.33 | 0.33 | 0.33 |
| 48 | Alum Mud litter amendment-2 g | 20 | 2 | 0 | 0 | 0 |

The treatments for this experiment were applied over a three day period (one rep each day). Twenty grams of fresh litter was weighed out from 48 samples each day. Twenty grams of litter were weighed into a large plastic weighing pan. The treatments were then surface applied as uniformly as possible with a spatula, then mixed into the litter. Each treatment was applied separately. The samples were then incubated in the dark at room temperature for 7 days. After incubation, the samples were extracted and analyzed for soluble reactive phosphorus as before.

Remarks/Comments

The effects of the addition of the four types of nanoparticles when applied at rates of 2.5, 5.0, and 10% by weight are shown in FIG. 4. All four types of nanoparticles resulted in significant reductions in soluble reactive phosphorus at these rates. However, reductions in soluble reactive phosphorus were significantly lower with TPX™ than the aluminum, iron, or ferric-manganese nanoparticles (FIG. 4). Generally, the ferric-manganese nanoparticles were in the form of the commercial product MNP™.

The addition of PLT™ increased soluble phosphorus, as was the case in experiment 2 (FIG. 5). When alum was added with PLT™, the soluble reactive phosphorus was still significantly higher than the untreated control, even at a high rate of alum. And surprisingly, when nanoparticles were applied with PLT™ the soluble reactive phosphorus was significantly lower. The lowest soluble reactive phosphorus concentrations measured were observed when PLT™ was applied with TPX™ (75 mg P/kg litter). This is an order of magnitude lower than when alum was applied at a high rate without PLT™ (789 mg P/kg).

Soluble reactive phosphorous in litter treated with alum and alum plus the four nanoparticles is shown in FIG. 6. Alum combined with TPX™ resulted in a 77% decrease in soluble reactive phosphorus concentrations compared to alum alone (214 vs 949 mg P/kg) and was the only alum/nanoparticle combination that resulted in lower soluble reactive phosphorus than alum alone. Likewise, when alum was mixed with two or three different types of nanoparticles, the only combinations that were significantly lower than alum alone where ones containing TPX™ (FIGS. 7 and 8).

Soluble reactive phosphorus levels in litter treated combinations of alum and conventional chemicals such as ferric sulfate, calcium chloride, and gypsum were not significantly lower than alum alone (FIG. 9). This makes the results regarding mixtures of alum and TPX™ or PLT™ and TPX™ even more surprising.

Experiment 5—Effects of Low Rates of TPX™ Applied in Combination with Sodium Bisulfate or Alum on Soluble Phosphorus in Poultry Litter Objective: Determine the effects of low rates of TPX™ applied in combination with sodium bisulfate or alum on soluble phosphorus in poultry litter.

Justification: Experiments 3 and 4 indicated that TPX™ was by far the best nanoparticle for reducing soluble phosphorus in litter, particularly when applied with chemicals like sodium bisulfate or alum, which are used for controlling ammonia in chicken houses. However, the rates of TPX™ used in those experiments were fairly high, so a study was needed to determine the effects of low rates of TPX™ on soluble phosphorus in litter.

Materials and Methods

This was a simple laboratory incubation study using litter from our pen trial. There were 10 treatments with three replications per treatment. The treatments were: control, PLT'-2 g, PLT™-2 g+TPX™-0.25 g, PLT™-2 g+TPX™-0.5 g, PLT™-2 g+TPX™-1 g, Alum-2 g, Alum-2 g+TPX™-0.25 g, Alum-2 g+TPX™-0.5 g, Alum-2 g+TPX™-1 g, and TPX™-1 g. Twenty g litter into a large plastic weighing pan and the chemical treatments were applied as uniformly as possible with a spatula, then mixed well. All chemicals were applied separately. The samples were extracted and analyzed for soluble reactive P as above.

Remarks/Comments

Soluble reactive phosphorous concentrations in poultry litter treated with PLT™ alone (3,410 mg P/kg) were significantly higher than the untreated control (2,331 mg P/kg) as was found in the previous experiments (FIG. 10). Soluble reactive phosphorus concentrations were significantly lower than the control when TPX™ was applied alone at 5% (847 mg P/kg) or when alum was applied at the 10% rate (681 mg P/kg). Surprisingly, when TPX™ was applied with alum at extremely low rates of 0.25, 0.5 and 1% by weight, the soluble reactive phosphorus levels were reduced to 365, 267 and 175 mg P/kg litter, respectively; all of which were significantly lower than alum alone. However, the biggest surprise of this research was observed when TPX™ was applied with PLT at these very low rates. At these very low levels of TPX™ the soluble reactive phosphorus levels of PLT-treated litter decreased from 3,410 mg P/kg (PLT alone) to 1,220, 541, and 233 mg P/kg litter, respectively, when 0.25, 0.5, and 1% TPX™ was added with PLT™. These rates of TPX™ would be equivalent to adding 100, 200, and 400 lbs per 16,000 square ft poultry house with 20,000 broilers. Whereas a typical rate of alum (10%) for the same house is two tons (4,000 lbs/house). The synergistic effects of adding PLT™ and TPX™ on soluble phosphorus in litter were totally unexpected and are difficult to explain. More research is needed to determine the exact mechanism of action.

For the foregoing reasons, it is clear that the subject matter described herein surprisingly provides an innovative composition and method of treating animal manure to both control ammonia emissions and non-point source phosphorus pollution (phosphorus leaching and runoff). Although the experiments outlined in these studies were conducted with poultry litter (a mixture of poultry manure, bedding material, spilled feed and feathers), it is understood that this technology would also reduce soluble phosphorus in the manure of all animals, including but not limited to beef cattle, dairy cattle, swine, ducks, laying hens, turkeys, and horses; the term "animal manure" includes such manures. The current system may be modified in multiple ways and applied in various technological applications. The disclosed method and apparatus may be modified and customized as required by a specific operation or application, and the individual components may be modified and defined, as required, to achieve the desired result.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed in this specification are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Similarly, if the term "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

We claim:

1. A phosphorus-binding composition comprising a combination of a calcium silicate hydrate nanoparticle material and an ammonia control material and a non-aqueous substrate, wherein the combination exhibits a phosphorus-binding result.

2. The phosphorus-binding composition of claim 1 wherein the ammonia control material comprises a proton donor.

3. The phosphorous-binding composition of claim 1 wherein the ammonia control material is selected from a group consisting of: alum, sodium bisulfate, ferric sulfate, ferric chloride, ferrous sulfate, ferrous chloride, aluminum chloride, potassium bisulfate, sulfuric acid, hydrochloric acid, nitric acid, acetic acid, and combinations thereof.

4. The composition of claim 1 wherein the non-aqueous substrate comprises poultry litter.

5. The phosphorus-binding composition of claim 1 wherein the composition contains calcium silicate hydrate nanoparticle in a range of about 0.001% to about 25%.

6. The phosphorus-binding composition of claim 1 wherein the composition contains an ammonia control material is in a range of about 0.01% to about 30%.

7. The phosphorus-binding composition of claim 1 wherein the non-aqueous substrate material comprises animal bedding at least partially comprised of animal manure litter.

8. The phosphorus-binding composition of claim 1 wherein the-non-aqueous substrate material comprises poultry manure or poultry litter, comprising a mixture of manure, bedding, spilled food and feathers.

9. A method of reducing soluble phosphorus runoff and/or leaching from a non-aqueous substrate comprising animal manure, the method comprising applying a composition comprising a combination of a calcium silicate hydrate nanoparticle material and an ammonia control material to the non-aqueous substrate.

10. The method of claim 9 wherein the calcium silicate hydrate concentration in the calcium silicate hydrate material is admixed into the non-aqueous substrate at a rate sufficient to cause a final concentration of between about 0.001% and about 20%.

11. The method of claim 9 wherein the ammonia control material comprises a proton donor.

12. The method of claim 9 wherein the ammonia control material is selected from a group consisting of: alum, sodium bisulfate, ferric sulfate, ferric chloride, aluminum chloride, potassium bisulfate, and combinations thereof.

13. The method of claim 9 wherein the ammonia control material is alum, sodium bisulfate, ferric sulfate, ferric chloride, ferrous sulfate, ferrous chloride, aluminum chloride, potassium bisulfate, sulfuric acid, hydrochloric acid, nitric acid, and/or acetic acid admixed with the non-aqueous substrate so that the concentration of the ammonia control material is between about 0.01% and about 30%.

14. The method of claim 9 wherein the ammonia control material is an acidified industrial or agricultural waste product, the waste product comprising at least one member selected from the group consisting of: alum mud litter amendment, acidified gypsum, acidified flue gas desulfurization materials, acidified fly ash, acidified red mud, acidified biochar, and mixtures thereof.

15. The method of claim 9 wherein the non-aqueous substrate material further comprises animal bedding.

16. The method of claim 9 wherein the non-aqueous substrate material further comprises poultry litter.

17. The method of claim 9 wherein the non-aqueous substrate material comprises manure from at least one member selected from the group consisting of: poultry, swine, dairy, duck, beef cattle, turkey, laying hen, and horse.

* * * * *